US011048226B2

(12) United States Patent
Prajapati et al.

(10) Patent No.: US 11,048,226 B2
(45) Date of Patent: Jun. 29, 2021

(54) PROGRAM AND VARIABLE CHANGE ANALYSIS

(71) Applicant: Fanuc America Corporation, Rochester Hills, MI (US)

(72) Inventors: Ashok Prajapati, Rochester Hills, MI (US); Kenneth W. Krause, Rochester Hills, MI (US); Michael B. Longo, Rochester Hills, MI (US); Rick E. Wunderlich, Canton, MI (US); Judy Evans, Oakland, MI (US); Glenn Nowak, Northville, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 16/330,965

(22) PCT Filed: Sep. 11, 2017

(86) PCT No.: PCT/US2017/050918
§ 371 (c)(1),
(2) Date: Mar. 6, 2019

(87) PCT Pub. No.: WO2018/049308
PCT Pub. Date: Mar. 15, 2018

(65) Prior Publication Data
US 2019/0258221 A1 Aug. 22, 2019

Related U.S. Application Data

(60) Provisional application No. 62/385,445, filed on Sep. 9, 2016.

(51) Int. Cl.
*G05B 19/4063* (2006.01)
*B25J 9/16* (2006.01)
(Continued)

(52) U.S. Cl.
CPC ........ *G05B 19/4063* (2013.01); *B25J 9/1674* (2013.01); *B25J 9/1682* (2013.01);
(Continued)

(58) Field of Classification Search
CPC ...... G05B 19/4063; G05B 2219/39412; G06Q 50/04; G06Q 10/0639; G07C 3/14;
(Continued)

(56) References Cited

U.S. PATENT DOCUMENTS 2,586,574 A * 2/1952 Smith ................. B03B 5/24
209/496
4,642,760 A * 2/1987 Yanai ................. G06F 13/24
700/12
(Continued)

*Primary Examiner* — Thomas C Lee
*Assistant Examiner* — Michael Tang
(74) *Attorney, Agent, or Firm* — John A. Miller; Shumaker, Loop & Kendrick, LLP

(57) ABSTRACT

Methods and systems include ways to implement change analysis of an automated production line including at least one robot. Monitoring a plurality of operating parameters associated with the automated production line including the at least one robot followed by recording at least one change to the plurality of operating parameters. A notification is then provided identifying the at least one change to the plurality of operating parameters. The notification can include mapping the at least one change onto a graphical representation of the automated production line, thereby identifying a portion of the automated production line affected by the at least one change. As a result, at least one of the operating parameters can be adjusted in response to the notification. An action can also be performed in response to the notification. In this manner, the change analysis can optimize operation of the automated production line.

20 Claims, 2 Drawing Sheets

(51) Int. Cl.
*G06Q 50/04* (2012.01)
*G06Q 10/06* (2012.01)
*G07C 3/14* (2006.01)
*G06F 11/00* (2006.01)
*G07C 3/08* (2006.01)

(52) U.S. Cl.
CPC ......... *G06F 11/00* (2013.01); *G06Q 10/0639* (2013.01); *G06Q 50/04* (2013.01); *G07C 3/14* (2013.01); *G05B 2219/39412* (2013.01); *G07C 3/08* (2013.01); *Y02P 90/30* (2015.11)

(58) Field of Classification Search
CPC ..... G07C 3/08; G06F 11/00; G06F 2201/865; G06F 11/3013; G06F 11/302; G06F 11/3079; B25J 9/1674; B25J 9/1682; Y02P 90/30
See application file for complete search history.

(56) References Cited

U.S. PATENT DOCUMENTS

| | | | | |
|---|---|---|---|---|
| 5,070,655 | A * | 12/1991 | Aggarwal | G05B 19/4063 451/5 |
| 5,309,351 | A * | 5/1994 | McCain | G05B 19/4063 340/13.24 |
| 5,353,238 | A | 10/1994 | Neef et al. | |
| 5,790,558 | A * | 8/1998 | Nakamura | G05B 19/4063 714/704 |
| 8,463,964 | B2 * | 6/2013 | Kostadinov | G05B 19/042 710/104 |
| 9,070,275 | B1 * | 6/2015 | Green | F16P 3/147 |
| 2001/0047504 | A1 | 11/2001 | Aoyama | |
| 2007/0067678 | A1 | 3/2007 | Hosek et al. | |
| 2008/0255772 | A1 * | 10/2008 | Sjostrand | B25J 9/1674 702/34 |
| 2009/0152244 | A1 * | 6/2009 | Kita | B23H 1/10 219/69.19 |
| 2010/0161141 | A1 | 6/2010 | Herre et al. | |
| 2013/0069579 | A1 * | 3/2013 | Uematsu | H02P 29/64 318/473 |
| 2015/0096352 | A1 * | 4/2015 | Peterson | F24F 11/33 73/31.02 |
| 2015/0323914 | A1 * | 11/2015 | Majewski | G05B 19/0426 700/86 |
| 2015/0367466 | A1 * | 12/2015 | Isobe | B23Q 3/15534 483/5 |
| 2016/0023355 | A1 * | 1/2016 | Komatsu | B25J 3/00 700/248 |
| 2016/0091883 | A1 * | 3/2016 | Fujiwara | G05B 19/058 700/3 |
| 2017/0105621 | A1 * | 4/2017 | Pratt | G16H 30/40 |
| 2017/0345233 | A1 * | 11/2017 | Wilson | G07C 3/08 |
| 2017/0369288 | A1 * | 12/2017 | Fulton | B25J 9/1676 |
| 2018/0190096 | A1 * | 7/2018 | Lundy | G08C 17/02 |
| 2020/0348662 | A1 * | 11/2020 | Cella | G05B 23/024 |

* cited by examiner

PROGRAM AND VARIABLE CHANGE ANALYSIS

CROSS-REFERENCE TO RELATED APPLICATIONS

This application claims the benefit of U.S. Provisional Application No. 62/385,445, filed on Sep. 9, 2016, the entire disclosure of which is incorporated herein by reference.

FIELD

The present technology relates to tracking changes in parameters used to operate an automated production line, where the automated production line can include one or more robots.

INTRODUCTION

This section provides background information related to the present disclosure which is not necessarily prior art.

A high incidence of down time is associated with unauthorized or frequent changes to parameters and program sequences controlling automated production lines. It is desirable, therefore, to provide means for identifying and analyzing such changes to maintain optimal performance of such production lines.

SUMMARY

The present technology includes systems and processes that relate to change analysis of operating parameters for automated production lines and ways to provide notification of such changes, allowing one to receive and optimize block parameters in controlling robots.

According to the present technology, change analysis of automated production lines can maximize operation of such automated production lines including one or more robots. Change analysis can serve in process optimization, tracking unauthorized changes affecting trajectories, user parameter changes that impact production line trajectories, identifying uncovered performance or fitness issues, and studying other side effects in device performance. The present technology can be used when a user wants to track the changes in program parameters and user parameters that impact the trajectory of the motion of the automated production line. Trajectory changes can directly impact energy consumption, unknown side effects that may cause motion faults, servicing intervals, etc. A schematic display of changes relative to the automated production line can allow one to quickly visualize trajectory changes and robot changes, as well as how multiple changes may interact or change trajectories along the automated production line. The change analysis can summarize the hierarchical representation of user changes to isolate changes and can identify whether any unauthorized changes occurred that caused or may cause production down time, or changes that can be used in identifying deterioration or failure of sub-components of the automated production line. Hierarchy structure of the automated production line can have various levels like plant, line, cluster, shift, station, robot, and style level.

In certain embodiments, ways are provided to implement change analysis of an automated production line including at least one robot. Such methods can include monitoring a plurality of operating parameters associated with the automated production line including the at least one robot. At least one change to the plurality of operating parameters is recorded. A notification is then provided identifying the at least one change to the plurality of operating parameters. As a result, at least one of the operating parameters can be adjusted in response to the notification. An action can also be performed in response to the notification, where the action can include one or more of making an environmental change to the automated production line, correcting a malfunction, performing a service interval, replacing a worn part, resolving an operational conflict, restoring power, and combinations thereof. In this manner, the change analysis can optimize operation of the automated production line.

In some embodiments, methods are provided for change analysis of an automated production line including a plurality of robots. In such methods, a plurality of operating parameters associated with the automated production line can be monitored, where the plurality of operating parameters includes a plurality of data blocks associated with a plurality of controllers, each controller controlling a respective robot. At least one change to the plurality of operating parameters is recorded, where the at least one change is received by the automated production line and includes a change to one of the data blocks associated with one of the controllers. A notification is provided that identifies the at least one change to the plurality of operating parameters. The notification includes a former value associated with the operating parameter prior to the change and a new value associated with the operating parameter after the change. The notification also includes mapping the at least one change to the plurality of operating parameters onto a representation of the automated production line, the mapping can thereby identify a portion of the automated production line affected by the at least one change.

In various embodiments, methods are provided for change analysis of an automated production line including a plurality of robots where a plurality of operating parameters are monitored, the operating parameters associated with the automated production line including the plurality of robots. The plurality of operating parameters includes a plurality of data blocks associated with a plurality of controllers, with each controller controlling a respective robot. Recordation of at least one change to the plurality of operating parameters is performed, where the at least one change is reported by the automated production line and includes a change to one of the data blocks associated with one of the controllers. The change includes an environmental change, a malfunction, identification of a service interval, a wear indicator, an operational conflict, and/or a power failure. A notification identifying the at least one change to the plurality of operating parameters is then provided, where the notification includes a former value associated with the operating parameter prior to the change and a new value associated with the operating parameter after the change. The notification also includes a map of the at least one change to the plurality of operating parameters onto a representation of the automated production line. In this way, the map identifies a portion of the automated production line affected by the at least one change.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
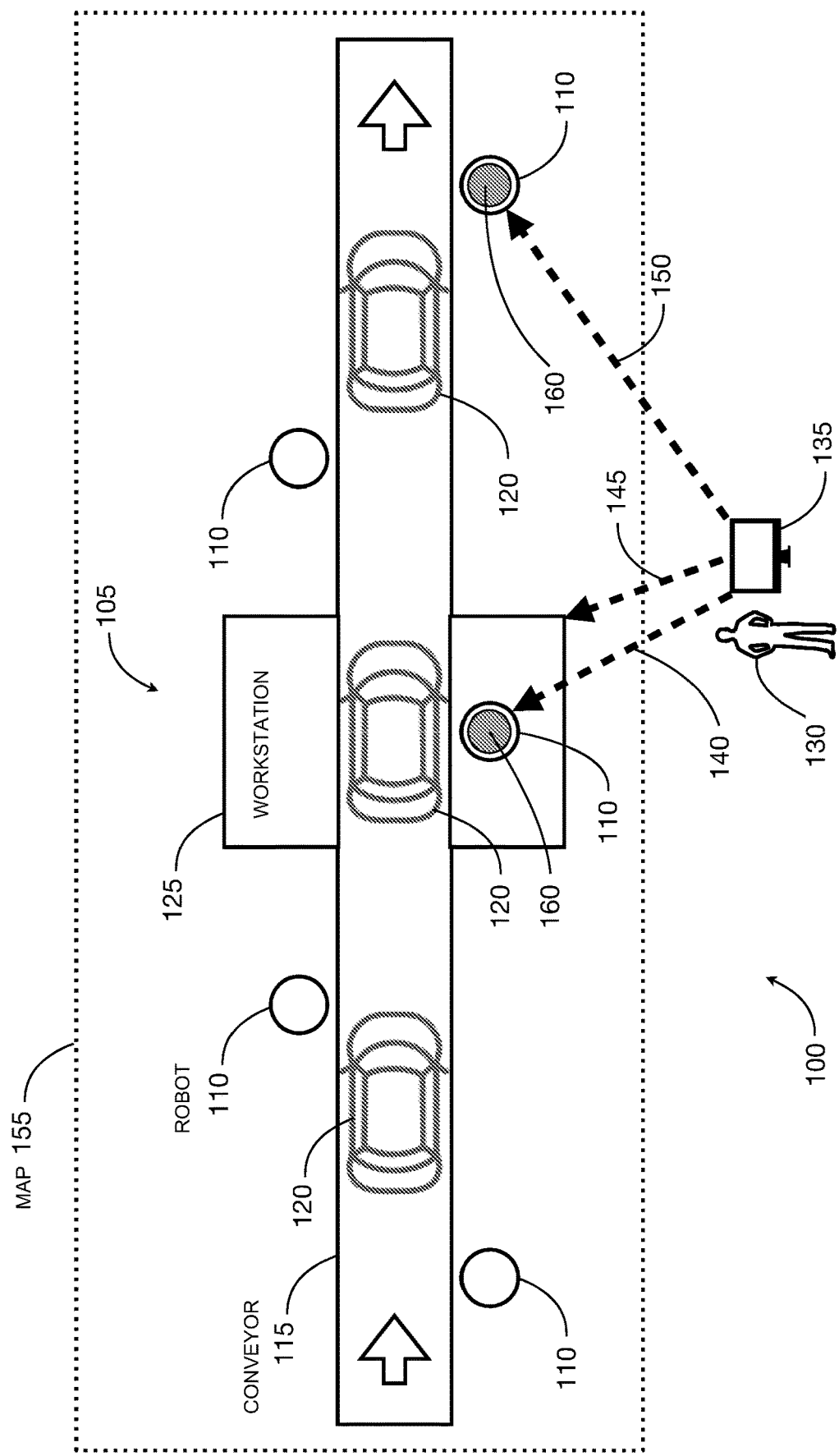
FIG. 1 illustrates a schematic of an automated production line where changes are received by the automated production line.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

The present technology provides various ways to analyze changes to an automated production line including one or more robots, where such robots can be configured for painting, welding, cutting, lifting, gripping, packaging, palletizing, etc. of one or more workpieces or articles at one or more workstations along the automated production line. Change analysis includes monitoring a plurality of operating parameters associated with the automated production line including the at least one robot. At least one change to the plurality of operating parameters is recorded. A notification is then provided that identifies the at least one change to the plurality of operating parameters. The notification can be provided to a user, such as a human operator or an automated system. The user can then intervene in the operation of the automated production line or initiate one or more automated responses particular to the notification.

The notification can include a former value associated with the operating parameter prior to the change and a new value associated with the operating parameter after the change. The former and new values can allow the user to determine the extent of the change or whether the change has attained a certain threshold. The recording of the change(s) to the operating parameters can be provided as a notification in real-time. Alternatively, the recording of one or more changes to the operating parameters can occur over a predetermined time interval. The notification can then be provided after the predetermined time interval. The notification can therefore be provided in time blocks (e.g., a minute, a half-hour, 1 hour, once-a-day, etc.), where the notification can include multiple changes that occurred during the predetermined time interval. Recording and notification can be repeated as desired, using the predetermined time interval, for example, so that successive changes are part of successive notifications. Notifications can also include a summary of changes for any given operating parameter, such as where the notification includes an original value, a changed value, and at least one more change to the value, etc. In this manner, the notification can provide a history of any changes to the operating parameters associated with the automated production line and associated robot(s). Various ways can be used to distinguish changes to an operating parameter in the notification, including timestamps, colors, chronological lists, etc. It is further possible to adjust the predetermined time interval to alter the recording time until a notification is provided of any changes.

The change analysis technology provided herein can be used at various points in operation of an automated production line employing one or more robots. For example, the change analysis can be concomitant with operation of the automated production line. The change analysis can also be performed when the automated production line is placed in operation, for example, during a powering-up phase of the line. Change analysis can also be applied during validation or trouble shooting of the automated production line.

The plurality of operating parameters associated with the automated production line can include a plurality of data blocks associated with one or more controllers, where the one or more controllers control one or more robots. One or more changes to the operating parameters can include one or more changes to the data blocks. The data blocks can relate to operating parameters of a respective robot, including ranges of motion, actions, location and manipulation of workpieces or articles, operation of one or more tools associated with the robot, durations of actions, movement through three-dimensional space, resetting positions for successive actions and/or operations on successive workpieces or articles, etc. The data blocks can also relate to sensors associated with the robot, where the sensors evaluate or measure aspects relating to workpieces or articles, and/or where the sensors evaluate or measure aspects relating to the performance of the robot. Examples include data blocks associated with supply levels associated with the robot or tools employed by the robot (e.g., paint, welding material, fasteners, etc.) and data blocks associated with robot diagnostics, including range of motion, force and torque measurements, operating speed, lubrication status, service hours relating to service intervals, etc.

The notification provided in the change analysis can include mapping one or more changes to the operating parameters onto a representation of the automated production line. In this way, the mapping can identify a portion of the automated production line affected by the at least one change. Successive or additional changes can also be mapped following the provision of further notifications. The mapping can therefore provide a dynamic representation of any changes occurring in operation parameters at one or more robots, for one or more workpieces or articles, and/or at one or more workstations within the automated production line. The mapping can constitute a representation of the automated production line as a two-dimensional schematic or a pseudo three-dimensional schematic, such as a perspective view of the automated production line. Mapping output can also be provided in graphical form that can allow the representation of the automated production line to be rotated, provide a change in zoom level, or provide a change in color, appearance, movement or flashing to readily identify the location of any changes along the representation of the automated production line. The notification can be provided on a touch screen to enable quick and simple negotiation of the mapping data and can include various lists or histories of changes by tapping on a location of a change.

Different types of changes can be recorded relative to the operating parameters of the automated production line. Changes include one or more changes received by the automated production line. For example, a change can be made to a robot, workstation, or other component of the automated production line, where the received change can reconfigure or alter the programming of functioning of the automated production line. One or more robots can receive a change. The operating parameters can include data blocks associated with a controller that controls at least one robot. The change received by the automated production line can include one or more changes to the data blocks associated with the controller. Initial setup, trouble shooting, or customizing of the robot can include changes to the data blocks. Various operators and repair or maintenance technicians can provide changes that are received by the automated production line. Adaption to new workpieces or articles processed on the automated production line may require changes to the operating parameters, where such changes received by the automated production line accommodate the new workpieces or articles. Changes to the data blocks associated with the controller can be entered using the controller. Alternatively, changes received by the automated production line can be remotely transmitted from a user (e.g., a human operator or an automated system).

Other changes that can be recorded relative to the operating parameters of the automated production line include one or more changes reported by the automated production line. That is, the automated production line can include various sensors or self-diagnostics to report a change in operation thereof or status thereof. Examples include where a robot, workstation, or other component of the automated production line reports a change including an environmental change, a malfunction, identification of a service interval, a wear indicator, an operational conflict, and/or a power failure. Environmental changes can include changes in temperature, humidity, etc. Malfunctions and service intervals can be reported via the change analysis. Wear indicators can report changes in movement or tolerances in movement thresholds, force or torque, or the expenditure of supplies such as paint, welding materials, fasteners, etc. Examples of operational conflicts include where a sensor detects unexpected physical contact, unexpected limitations in range of motion, unexpected or absent workpieces or articles, etc. A power failure or communication failure in a robot, workstation, or other component can also be reported by the automated production line.

The present technology further provides ways to respond to one or more changes provided via the notification. For example, the operating parameters of the automated production line can be adapted in response to the change. This can include adjusting at least one of the operating parameters in response to the notification. For example, an adjustment or correction can be applied to offset an effect of the change. Various actions can also be taken in response to the notification, including making an environmental change to the automated production line, correcting a malfunction, performing a service interval, replacing a worn part, recharging or refilling a consumable, resolving an operational conflict, and/or restoring power.

Certain methods are provided for change analysis of an automated production line including a plurality of robots, where the methods include steps of monitoring, recording, and providing a notification. The monitoring step includes monitoring a plurality of operating parameters associated with the automated production line including the plurality of robots, the plurality of operating parameters includes a plurality of data blocks associated with a plurality of controllers, each controller controlling a respective robot. The recording step includes recording at least one change to the plurality of operating parameters, wherein the at least one change is received by the automated production line and includes a change to one of the data blocks associated with one of the controllers. Providing a notification includes where the notification identifies the at least one change to the plurality of operating parameters, where the notification includes a former value associated with the operating parameter prior to the change and a new value associated with the operating parameter after the change. The notification also includes mapping the at least one change to the plurality of operating parameters onto a representation of the automated production line, with the mapping identifying a portion of the automated production line affected by the at least one change.

Additional methods are provided for change analysis of an automated production line including a plurality of robots. Such methods include monitoring a plurality of operating parameters associated with the automated production line including the plurality of robots, where the plurality of operating parameters includes a plurality of data blocks associated with a plurality of controllers, and each controller controls a respective robot. At least one change to the plurality of operating parameters is recorded, where the at least one change is reported by the automated production line and includes a change to one of the data blocks associated with one of the controllers. The change includes one or more of an environmental change, a malfunction, an identification of a service interval, a wear indicator, an operational conflict, and a power failure. A notification is provided that identifies the at least one change to the plurality of operating parameters, where the notification includes a former value associated with the operating parameter prior to the change and a new value associated with the operating parameter after the change. The notification further includes mapping the at least one change to the plurality of operating parameters onto a representation of the automated production line to identify a portion of the automated production line affected by the at least one change.

Other methods for program and variable change analysis for factory automation devices including a robot with a controller are provided. Such methods can include monitoring data blocks on the controller for variables and scanning programs for any changes including creation, deletion, and its properties. These methods can advise a user what change has occurred. For example, the data blocks can be at least one of variables, system or user, registers, and digital I/O and line-by-line changes for user or system programs. Such methods can also include the use of an Intelligent Messaging Service (IMS) to facilitate sending data via configured transport channels which could be email, or HTTP client, or texting any configured phone, or file dump to remote devices, which include the change based on user configurations.

References herein to a robot and an associated controller also apply to multiple robots, multiple controllers, and/or master/slave robot configurations. Variable change monitoring includes monitoring data blocks on the controller and advising the user what change has occurred. These blocks can be: variables, system or user; registers; and digital I/O. Similarly, user programs can be monitored for any changes that a user has made which monitors, creation, deletion, any property of programs i.e. header information which includes write protection, group masks, any associated creator credentials, access level etc., any remarks or comments. Each change can be identified as soon as it happens along with the new and old values to see the differences. Notification of change can be sent to the user via Intelligent Messaging Service (IMS hereinafter). Frequency of notification is configurable and can be controlled during run time.

An IMS can be used to facilitate sending data via various transport channels like email, or HTTP, texting, and file dump to remote devices based on user configuration settings. It can provide mainly two functions: (1) notifying the user about the change based on a user configuration provided via XML file or an on-screen configuration; and (2) custom user program can be used to send user defined messages e.g. production status, part counts, summary etc. This feature can also include system variables to control the queue size and a timer to send the messages. IMS also allows sending data on high priority basis if marked. This was high priority data can be send immediately. There is another timer to send the status message out every so often. The status message will get sent on each power up and then every set period that can include summary information what options loaded and last power off time etc. At power up the IMS can execute a task that will read a file and build the scanning data structures. According to the data in this file variables are scanned by the IMS task. For any changes an error is posted, logbook can be updated and the change can be sent using the configured method.

EXAMPLES—With reference to FIG. 1, a first embodiment 100 of a change analysis according to the present technology is applied to an automated production line 105 including multiple robots 110, where the automated production line 105 is shown generally in an overhead schematic view. The automated production line 105 also includes a conveyor 115 to move workpieces 120, here depicted as three automobile bodies, in the direction of the arrows, and a workstation 125, here configured as a paint booth. The automated production line 105 shown may be only a portion of a larger automated production line and it is understood that the automated production line 105 may include additional components, including additional robots 110, conveyors 115, workpieces 120, and workstations 125, among other components. A user 130 can communicate with the automated production line 105 using an electronic device 135, depicted as a computer. It is understood that the user 130 and/or the electronic device 135 can be remote or local to the automated production line 105, can communicate with the automated production line 105 through a wired or wireless network, and that the electronic device 135 can take many forms from personal computers, computer workstations, laptop computers, to various handheld devices, including various smartphones. The electronic device 135 can also communicate with other electronic devices using cellular networks or the internet. For example, the user 130 can have a smartphone on their person that can act as a second electronic device 135.

One or more operating parameters associated with the automated production line 105 can be monitored, where the operating parameters include data blocks associated with controllers, each controller controlling a respective robot 110. Particular controllers are not shown in the figure, as the controller for each robot 110 can be part of the robot 110, can be a separate part of the automated production line 105, and/or can be part of the electronic device 135 that is in communication with each robot 110. One or more changes to the operating parameters are recorded, where one or more changes are received by the automated production line and include a change to one of the data blocks associated with one of the controllers. For example, the automated production line 105 may have a recording means or the electronic device 135 can be configured to record the one or more changes. The one or more changes are received by the automated production line 105 as shown by communication arrows 140, 145, and 150 originating from the electronic device 135. It is understood that the change(s) can also be received by the automated production line 105 in other ways, including remote or manual entry into a controller of a particular robot 110, changing an operating parameter of a workstation 125 or the conveyor 115, etc. The communication arrows 140, 145, and 150 represent certain examples of where the automated production line 105 receives multiple changes to operating parameters. In particular, communication arrow 140 represents an instruction from the electronic device 135 (as inputted by the user 130) to change the paint color being applied by the robot 110 within the paint booth workstation 125. Communication arrow 145 represents an instruction to change an exhaust fan speed of the paint booth workstation 125. Communication arrow 150 represents an instruction to change the location of an assembly operation on the workpiece 120 by the respective robot 110.

Once the changes directed by communication arrows 140, 145, and 150 are received by the automated production line 105, a notification identifying the changes to the respective operating parameters is provided. The notification can be provided back to the electronic device 135 and stored as part of a history log, or can be sent to another electronic device such as one or more users' smartphones. The notification includes a former value associated with the operating parameter prior to the change and a new value associated with the operating parameter after the change. In this manner, the nature or extent of the change can be readily identified. The notification also includes mapping the changes to the operating parameters onto a representation of the automated production line 105, where the mapping identifies portions of the automated production line 105 affected by the changes. For example, the notification can include a map graphically depicting the automated production line on a screen of an electronic device (e.g., electronic device 135), where the graphic depiction includes the features encompassed by box 155. Robots 110 that received changes can be identified by highlights 160 (shaded area), color change, flashing, etc. The user 130 can therefore readily ascertain the location of changes to the automated production line 105 using the mapping and graphic depiction included in box 155. It should be appreciated that the changes directed by communication arrows 140, 145, and 150 can be part of the same notification or can be separated in time and provided in successive notifications.

Figure 2:
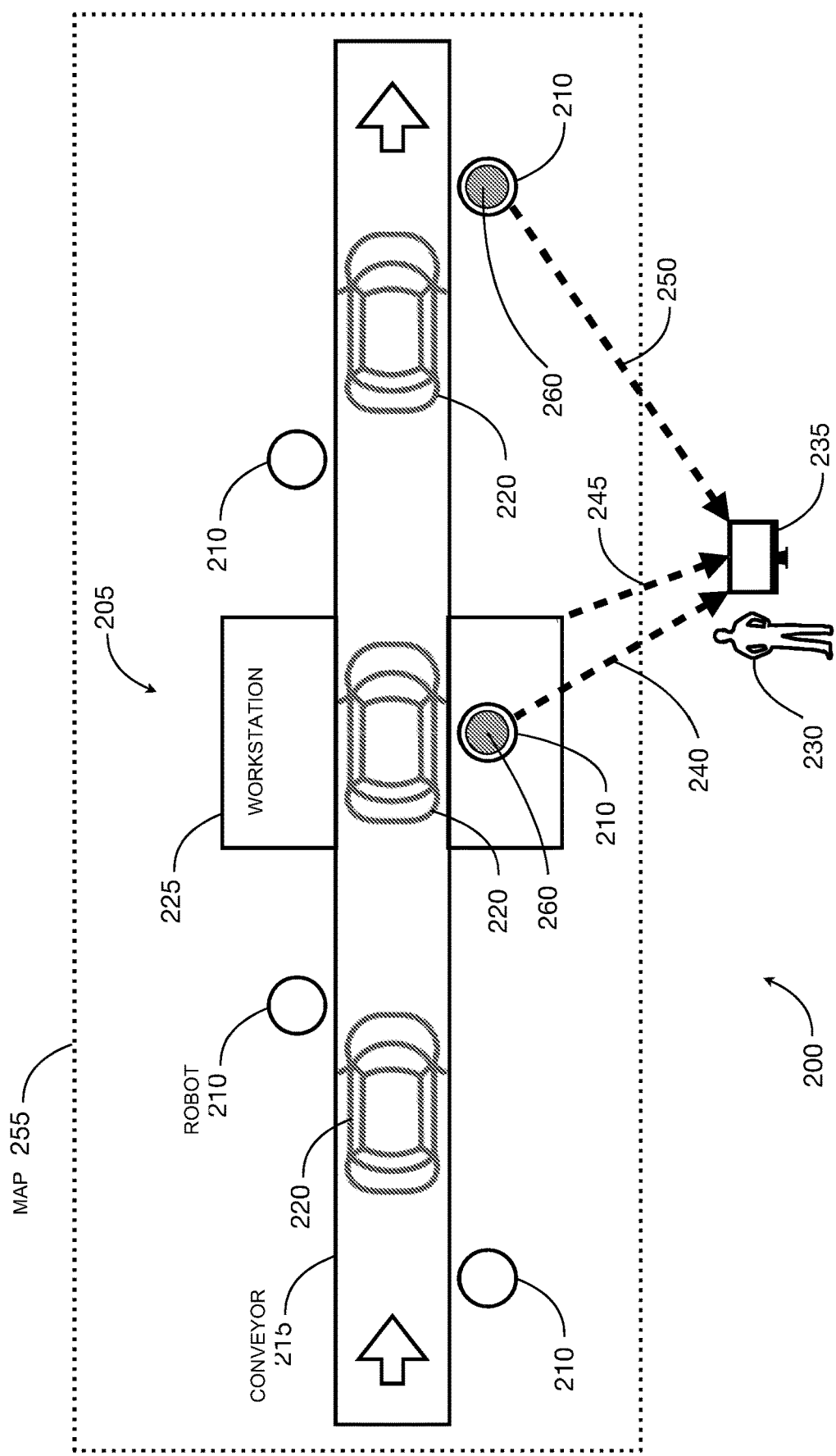
FIG. 2 illustrates a schematic of an automated production line where changes are reported by the automated production line.

With reference to FIG. 2, a second embodiment 200 of a change analysis according to the present technology is applied to an automated production line 205 including multiple robots 210, where the automated production line 205 is shown generally in an overhead schematic view. The automated production line 205 also includes a conveyor 215 to move workpieces 220, here depicted as three automobile bodies, in the direction of the arrows, and a workstation 225, here configured as a paint booth. The automated production line 205 shown may be only a portion of a larger automated production line and it is understood that the automated production line 205 may include additional components, including additional robots 210, conveyors 215, workpieces 220, and workstations 225, among other components. A user 230 can communicate with the automated production line 205 using an electronic device 235, depicted as a computer. It is understood that the user 230 and/or the electronic device 235 can be remote or local to the automated production line 205, can communicate with the automated production line 205 through a wired or wireless network, and that the electronic device 235 can take many forms from personal computers, computer workstations, laptop computers, to various handheld devices, including various smartphones. The electronic device 235 can also communicate with other electronic devices using cellular networks or the internet. For example, the user 230 can have a smartphone on their person that can act as a second electronic device 235.

One or more operating parameters associated with the automated production line 205 can be monitored, where the operating parameters include data blocks associated with controllers, each controller controlling a respective robot 210. Particular controllers are not shown in the figure, as the controller for each robot 210 can be part of the robot 210, can be a separate part of the automated production line 205, and/or can be part of the electronic device 235 that is in communication with each robot 210. One or more changes to the operating parameters of the automated production line 205 are recorded, where the changes are reported by the automated production line 205. These include changes to one or more data blocks associated with one of the controllers. For example, the automated production line 205 may have a recording means or the electronic device 235 can be configured to record the one or more changes. The changes reported by the automated production line 205 are shown as communication arrows 240, 245, and 250 originating from two robots 210 and the workstation 225 of the automated production line 205. It is understood that these changes can also be reported by the automated production line 205 in various ways, including wired and wireless communication to various electronic devices, including the depicted electronic device 235, a smartphone carried by the user 230 or other individuals, via cellular networks or the internet, etc. The communication arrows 240, 245, and 250 represent certain examples of where the automated production line 205 reports multiple changes to operating parameters. In particular, communication arrow 240 represents where the supply of paint to the respective robot 210 within the paint booth workstation 225 needs replenished or has run out. Communication arrow 245 represents where a sensor in the paint booth workstation 225 has identified a change in humidity that can affect paint application. Communication arrow 250 represents where the respective robot 210 has ascertained a failure in meeting a selected torque threshold in operating on the workpiece 220, which may be indicative of a malfunction of or wear to the robot 210.

Once the changes depicted by the communication arrows 240, 245, and 250 are reported by the automated production line 205, a notification identifying the changes to the respective operating parameters is provided. The notification can be provided to the electronic device 235 and stored as part of a history log, or can be sent to another electronic device such as one or more users' smartphones. The notification includes a former value associated with the operating parameter prior to the change and a new value associated with the operating parameter after the change. In this manner, the nature or extent of the change can be readily identified. The notification also includes mapping the changes to the operating parameters onto a representation of the automated production line 205, where the mapping identifies portions of the automated production line 205 affected by the changes. For example, the notification can include a map graphically depicting the automated production line on a screen of an electronic device (e.g., electronic device 235), where the graphic depiction includes the features encompassed by box 255. Robots 210 that reported changes can be identified by highlights 260 (shaded area), color change, flashing, etc. The user 230 can therefore readily ascertain the location of changes to the automated production line 205 using the mapping and graphic depiction included in box 255. It should be appreciated that the changes depicted by the communication arrows 240, 245, and 250 can be part of the same notification or can be separated in time and provided in successive notifications.

It should be understood that the present technology contemplates change analysis combinations of the first embodiment 100 and the second embodiment 200, where an automated production line receives one or more changes to the operating parameters and reports one or more changes to the operating parameters.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method for change analysis of an automated production line including at least one robot, the method comprising the steps of:
   (a) monitoring, using one or more computing devices having a processor and memory, a plurality of operating parameters associated with the automated production line including the at least one robot;

(b) recording, using the one or more computing devices, at least one change to the plurality of operating parameters over a predetermined time interval; and (c) providing, using the one or more computing devices, a notification identifying the at least one change to the plurality of operating parameters after the predetermined time interval and adjusting the predetermined time interval until a notification identifying at least one more change is provided;

(d) repeating the steps (b), (c) and (d) with respect to at least one more change to the plurality of operating parameters.

2. The method of claim 1, wherein the notification includes a former value associated with the operating parameter prior to the change and a new value associated with the operating parameter after the change.

3. The method of claim 1, wherein the step (b) includes recording a plurality of changes to the plurality of operating parameters over the predetermined time interval.

4. The method of claim 1, wherein the notification in the repeating of the step (c) distinguishes the at least one change and the at least one more change.

5. The method of claim 1, wherein the automated production line is in operation during the method.

6. The method of claim 1, wherein the method is performed when the automated production line is placed in operation.

7. The method of claim 1, wherein the plurality of operating parameters includes a plurality of data blocks associated with a controller, the controller controlling the at least one robot.

8. The method of claim 7, wherein the at least one change to the plurality of operating parameters includes a change to at least one of the data blocks.

9. The method of claim 1, wherein the automated production line includes a plurality of robots, the plurality of operating parameters includes a plurality of data blocks associated with a plurality of controllers, each of the controllers controlling a respective robot.

10. The method of claim 1, wherein the notification provided in the step (c) includes mapping the at least one change to the plurality of operating parameters onto a graphical representation of the automated production line, the mapping identifying a portion of the automated production line affected by the at least one change.

11. The method of claim 10, wherein the representation of the automated production line includes one of a two-dimensional schematic and a pseudo three-dimensional schematic.

12. The method of claim 1, wherein the at least one change is a change received by the automated production line.

13. The method of claim 12, wherein the plurality of operating parameters includes a plurality of data blocks associated with a controller, the controller controlling the at least one robot, and the change received by the automated production line includes a change to one of the data blocks associated with the controller.

14. The method of claim 13, wherein the change to one of the data blocks associated with the controller is entered using the controller.

15. The method of claim 1, wherein the at least one change is a change reported by the automated production line.

16. The method of claim 15, wherein the change reported by the automated production line includes a member selected from the group consisting of: an environmental change, a malfunction, an identification of a service interval, a wear indicator, an operational conflict, a power failure, and combinations thereof.

17. The method of claim 1, further comprising adjusting at least one of the operating parameters in response to the notification.

18. The method of claim 1, further comprising performing an action in response to the notification, the action including a member of the group consisting of: making an environmental change to the automated production line, correcting a malfunction, performing a service interval, replacing a worn part, recharging or refilling a consumable, resolving an operational conflict, restoring power, and combinations thereof.

19. A method for change analysis of an automated production line including a plurality of robots, the method comprising:

(a) monitoring, using one or more computing devices having a processor and memory, a plurality of operating parameters associated with the automated production line including the plurality of robots, the plurality of operating parameters including a plurality of data blocks associated with a plurality of controllers, each of the controllers controlling a respective robot;

(b) recording, using the one or more computing devices, at least one change to the plurality of operating parameters over a predetermined time interval, wherein the at least one change is received by the automated production line and includes a change to one of the data blocks associated with one of the controllers; and (c) providing, using the one or more computing devices, a notification identifying the at least one change to the plurality of operating parameters after the predetermined time interval and adjusting the predetermined time interval until a notification identifying at least one more change is provided, wherein the notification includes a former value associated with the operating parameter prior to the change and a new value associated with the operating parameter after the change, and the notification includes mapping the at least one change to the plurality of operating parameters onto a graphical representation of the automated production line, the mapping identifying a portion of the automated production line affected by the at least one change;

(d) repeating the steps (b), (c) and (d) with respect to at least one more change to the plurality of operating parameters.

20. A method for change analysis of an automated production line including a plurality of robots, the method comprising:

(a) monitoring, using one or more computing devices having a processor and memory, a plurality of operating parameters associated with the automated production line including the plurality of robots, the plurality of operating parameters including a plurality of data blocks associated with a plurality of controllers, each of the controllers controlling a respective robot;

(b) recording, using the one or more computing devices, at least one change to the plurality of operating parameters over a predetermined time interval, wherein the at least one change is reported by the automated production line and includes a change to one of the data blocks associated with one of the controllers, the change including a member selected from the group consisting of: an environmental change, a malfunction, identification of a service interval, a wear indicator, an operational conflict, a power failure, and combinations thereof; and (c) providing, using the one or more computing devices, a notification identifying the at least one change to the plurality of operating parameters after the predetermined time interval and adjusting the predetermined time interval until a notification identifying at least one more change is provided, wherein the notification includes a former value associated with the operating parameter prior to the change and a new value associated with the operating parameter after the change, and the notification includes mapping the at least one change to the plurality of operating parameters onto a graphical representation of the automated production line, the mapping identifying a portion of the automated production line affected by the at least one change;

(d) repeating the steps (b), (c) and (d) with respect to at least one more change to the plurality of operating parameters.

* * * * *